United States Patent
Kintaka

(10) Patent No.: US 7,538,056 B2
(45) Date of Patent: May 26, 2009

(54) TRANSLUCENT CERAMIC, METHOD FOR MANUFACTURING THE SAME, OPTICAL COMPONENT, AND OPTICAL APPARATUS

(75) Inventor: Yuji Kintaka, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/099,633

(22) Filed: Apr. 8, 2008

(65) Prior Publication Data

US 2008/0194396 A1 Aug. 14, 2008

Related U.S. Application Data

(63) Continuation of application No. PCT/JP2006/319838, filed on Oct. 4, 2006.

(30) Foreign Application Priority Data

Oct. 25, 2005 (JP) ............................. 2005-310217

(51) Int. Cl.
*C04B 35/495* (2006.01)
(52) U.S. Cl. ..................................... 501/135; 264/673
(58) Field of Classification Search ................. 501/134, 501/135; 264/673
See application file for complete search history.

(56) References Cited

FOREIGN PATENT DOCUMENTS

| JP | 5127078 | 5/1993 |
|----|---------|--------|
| JP | 7244865 | 9/1995 |
| JP | 2002037698 | 2/2002 |
| JP | 2003055098 | 2/2003 |
| JP | 2004043194 | 2/2004 |
| JP | 2004075512 | 3/2004 |
| JP | 2004075516 | 3/2004 |

OTHER PUBLICATIONS

Machine translation of JP 2002037698, Feb. 2002.*
Machine translation of JP 2003055098, Feb. 2003.*
M. Berkowski et al., Growth and structure of $SrAl_{0.5}Ta_{0.5}O_3$: $LaAlO_3$: $CaAl_{0.5}Ta_{0.5}O_3$ solid solutioins single crystals, Journal of crystal growth, vol. 269, p. 512-517, 2004.

* cited by examiner

*Primary Examiner*—Karl E Group
(74) *Attorney, Agent, or Firm*—Dickstein Shapiro LLP

(57) ABSTRACT

A translucent ceramic includes a perovskite-type compound as a main component having a composition represented by the general formula $(La_{1-x}(Sr_{1-a-b}Ba_aCa_b)_x)((Al_{1-c}Ga_c)_{1-y}(Ta_{1-d}Nb_d)_y)_vO_w$ (wherein $0<x\leq1$, $0<y\leq0.6$, $0.4\leq y/x\leq0.6$, $0\leq a\leq1$, $0\leq b\leq1$, $0\leq c\leq1$, $0\leq d\leq1$, $0.9\leq v\leq1.1$ and w is a positive number for keeping an electrical neutrality). The translucent ceramic has a high refractive index and a large Abbe number. Therefore, the translucent ceramic has an advantage in correction of aberration and is preferably used for lenses, which are disposed so as to hold a diaphragm therebetween, in a Gauss lens optical system such as an optical system for a single-lens reflex camera.

15 Claims, 4 Drawing Sheets

13

14

TRANSLUCENT CERAMIC, METHOD FOR MANUFACTURING THE SAME, OPTICAL COMPONENT, AND OPTICAL APPARATUS

This is a continuation of application Ser. No. PCT/JP2006/319838, filed Oct. 4, 2006.

TECHNICAL FIELD

The present invention relates to a translucent ceramic that is useful as a material for optical components such as lenses, a method for manufacturing the same, and optical components and optical apparatuses using the same.

BACKGROUND ART

Conventionally, as described in Patent Document 1 and Patent Document 2 for example, optical components such as lenses mounted on optical apparatuses such as optical imaging units have been made of glass, plastic, or single crystals such as lithium niobate ($LiNbO_3$).

Since glass and plastic have high light transmittance and can be easily formed into a desired shape, they are mainly used for optical components such as lenses. On the other hand, single crystals such as $LiNbO_3$ are mainly used for optical components such as light wave guides using the electric-optical properties or birefringence of the single crystals. Optical apparatuses using these optical components, for example an optical pickup, are required to become further miniaturized or thinned.

However, since refractive indices of conventional glasses or plastics are less than 1.9, there is a limitation upon the amount of miniaturization or thinning of the optical components and optical apparatuses using glasses or plastics. Furthermore, since plastics, in particular, not only have disadvantageously low resistance against humidity but also cause birefringence in some cases, plastics also have the problem of a difficulty in efficiently transmitting and condensing incident light.

On the other hand, while single crystals such as $LiNbO_3$ have relatively high refractive indices of as high as 2.3, the single crystals also produce birefringence. Therefore, it is difficult to use the single crystals for optical components such as lenses, and thus the application of the single crystals is disadvantageously limited.

A translucent ceramic including a $Ba(Mg, Ta)O_3$ type perovskite as a main component is disclosed in Patent Document 3 as a material having no birefringence and excellent optical properties, i.e., having linear transmittance and refractive index. Also, a translucent ceramic including a $Ba(Zn, Ta)O_3$ type perovskite as a main component is disclosed in Patent Document 4.

Optical properties such as refractive indices and Abbe numbers of the translucent ceramic described in Patent Document 3 can be changed by substituting a part of Mg and/or Ta with Sn and/or Zr.

Similarly, the translucent ceramic disclosed in Patent Document 4 can be also changed in refractive index and Abbe number.

However, since the translucent ceramics described in Patent Document 3 and Patent Document 4 have small Abbe numbers, applications as optical components or optical apparatuses are limited.

Patent Document 1: Japanese Unexamined Patent Application Publication No. 5-127078 (all pages and FIG. 1)
Patent Document 2: Japanese Unexamined Patent Application Publication No. 7-244865 (claim 6 and paragraph [0024])
Patent Document 3: Japanese Unexamined Patent Application Publication No. 2004-75512 (all pages and all drawings)
Patent Document 4: Japanese Unexamined Patent Application Publication No. 2004-75516 (all pages and all drawings)

DISCLOSURE OF INVENTION

Problems to be Solved by the Invention

The present invention has been made in consideration of the above-mentioned situation and provides a translucent ceramic having a large Abbe number and a method for manufacturing the same.

The present invention further provides an optical component composed of the translucent ceramic and an optical apparatus including the optical component.

Means for Solving the Problems

A translucent ceramic of the present invention includes a perovskite-type compound as a main component having a composition represented by a general formula, $(La_{1-x}(Sr_{1-a-b}Ba_aCa_b)_x)((Al_{1-c}Ga_c)_{1-y}(Ta_{1-d}Nb_d)_y)_vO_w$ (wherein $0 < x \leq 1$, $0 < y \leq 0.6$, $0.4 \leq y/x \leq 0.6$, $0 \leq a \leq 1$, $0 \leq b \leq 1$, $0 \leq c \leq 1$, $0 \leq d \leq 1$, and $0.9 \leq v \leq 1.1$ and w is a positive number determined to keep electrical neutrality of the translucent ceramic).

In the translucent ceramic of the present invention, y/x is preferably within the range of $0.45 \leq y/x \leq 0.55$, v is preferably within the range of $0.95 \leq v \leq 1.02$, and x is preferably within the range of $0.2 \leq x \leq 1$.

The linear transmittance of the translucent ceramic of the present invention is preferably 20% or more when a sample having a thickness of 0.4 mm is measured using visible light having a wavelength of 633 nm (hereinafter, referred to simply as a "linear transmittance" unless otherwise noted).

Furthermore, the translucent ceramic of the present invention particularly exhibits a remarkable effect when the translucent ceramic is polycrystalline.

The present invention can also be applied to a method for manufacturing the translucent ceramic mentioned above. The method for manufacturing the translucent ceramic of the present invention includes the steps of preparing a green ceramic molded body made of ceramic raw powder and formed in a predetermined shape, preparing a co-firing composition having substantially the same composition as the ceramic raw powder, and firing the green ceramic molded body in an atmosphere at an oxygen concentration of 90 vol % or more with the co-firing composition in contact with the green ceramic molded body.

In the method for manufacturing the translucent ceramic of the present invention, the co-firing composition is preferably in a powder state and the firing is preferably performed with the green ceramic molded body buried in the powder of the co-firing composition.

The present invention may also be applied to an optical component including the above-mentioned translucent ceramic and an optical apparatus having the optical component mounted thereon.

Advantages

Since the refractive index of the translucent ceramic of the present invention is as high as 2.01 or more, the translucent ceramic can be advantageously used to miniaturize optical components such as lenses. Furthermore, since the Abbe number of the translucent ceramic of the present invention is as large as 30 or more, when used as a material for lenses, and in particular, for lenses of optical imaging units for a wide wavelength range of visible light, such as cameras and video cameras, the translucent ceramic is useful in correcting chromatic aberration or spherical aberration.

Figure 1:
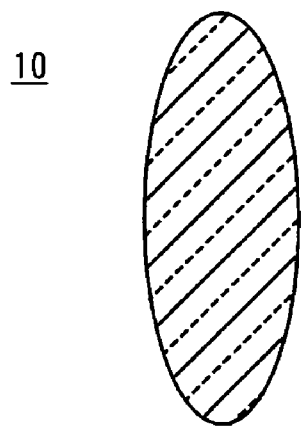
FIG. 1 is a cross-sectional view of a double-convex lens 10 as a first example of an optical component made of a translucent ceramic of the present invention.
Figure 2:
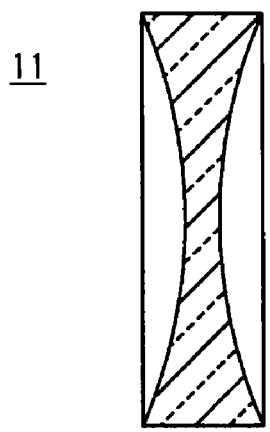
FIG. 2 is a cross-sectional view of a double-concave lens 11 as a second example of an optical component made of a translucent ceramic of the present invention.
Figure 3:
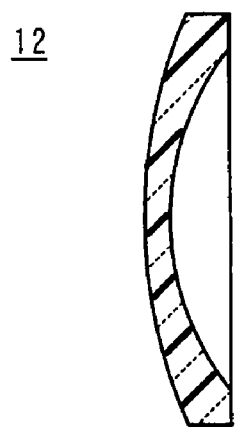
FIG. 3 is a cross-sectional view of a meniscus lens 12 as a third example of an optical component made of a translucent ceramic of the present invention.
Figure 4:
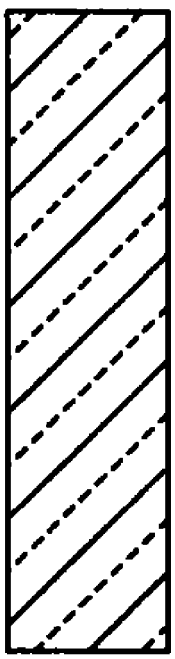
FIG. 4 is a cross-sectional view of an optical-length adjustor 13 as a fourth example of an optical component made of a translucent ceramic of the present invention.
Figure 5:
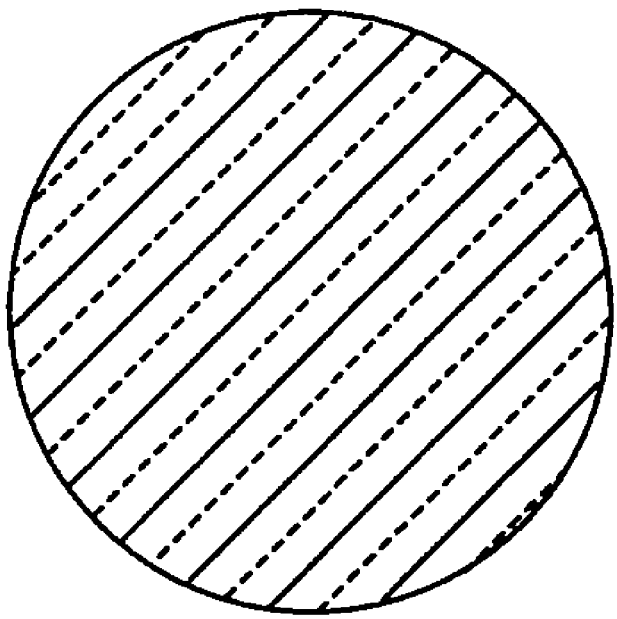
FIG. 5 is a cross-sectional view of a spherical lens 14 as a fifth example of an optical component made of a translucent ceramic of the present invention.

REFERENCE NUMERALS 1 recording medium
2 objective lens
3 half mirror
4 collimator lens
5 semiconductor laser
6 condensing lens
7 light receiving element
8 laser beam
9 optical pickup
10 double-convex lens
11 double-concave lens
12 meniscus lens
13 optical-length adjustor
14 spherical lens
20 Gauss lens optical system
21 to 27 lens

BEST MODES FOR CARRYING OUT THE INVENTION

A translucent ceramic of the present invention has a perovskite structure represented by $ABO_3$ and a molar ratio between the A-site, B-site, and oxygen of about 1:1:3. Specifically, the translucent ceramic is a $LaAlO_3$ type perovskite compound which is substituted by a (Sr, Ba, Ca)((Al, Ga)(Ta, Nb))$O_3$ type perovskite compound according to demand. The (Sr, Ba, Ca)((Al, Ga)(Ta, Nb))$O_3$ type perovskite compound is a complex perovskite compound having a molar ratio of (Al, Ga) to (Ta, Nb) of about 1:1.

A composition formula of the translucent ceramic of the present invention is $(La_{1-x}(Sr_{1-a-b}Ba_aCa_b)_x)((Al_{1-c}Ga_c)_{1-y}(Ta_{1-d}Nb_d)_y)_vO_w$ (wherein $0<x\leq1$, $0<y\leq0.6$, $0.4\leq y/x\leq0.6$, $0\leq a\leq1$, $0\leq b\leq1$, $0\leq c\leq1$, $0\leq d\leq1$, and $0.9\leq v\leq1.1$, with w being a positive number for maintaining the electrical neutrality of the translucent ceramic). La, Sr, Ba, and Ca are mainly located at A-sites of the perovskite structure and Al, Ga, Ta, and Nb are mainly located at B-sites of the perovskite structure. Note that these elements may be located outside a crystal or at another site in small amounts as long as the object of the present invention is fulfilled.

Furthermore, x represents an amount of substitution at the A-sites and y represents an amount of substitution at the B-sites. In order to keep the electrical neutrality of the perovskite structure, the value of y/x is required to be about 0.5. Actually, if the value of y/x is outside the range of $0.4\leq y/x\leq0.6$, unpreferably, the linear transmittance is less than 20%.

Similarly, the value of v is required to be about 1 in order to keep the perovskite structure. If the value of v is outside the range of $0.9\leq v\leq1.1$, unpreferably, the linear transmittance is less than 20%.

More restrictively, if the value of y/x is within a range of $0.45\leq y/x\leq0.55$, the value of v is within a range of $0.95\leq v\leq1.02$, and further, the value of x is within a range of $0.2\leq x\leq1$, preferably, the linear transmittance is 50% or more.

Furthermore, the translucent ceramic of the present invention may have impurities that can be inevitably mixed during a manufacturing process, as long as the object of the present invention is fulfilled. Examples of the impurities contained in an oxide or a carbonate used as a raw material or mixed during a manufacturing process include $Fe_2O_3$, $B_2O_3$, $WO_3$, $Bi_2O_3$, $Sb_2O_5$, $P_2O_5$, CuO, and rare earth oxides such as $Y_2O_3$.

Next, a method for manufacturing the translucent ceramic of the present invention is described.

In order to manufacture the translucent ceramic, a green ceramic molded body made of ceramic raw powder and formed in a predetermined shape is prepared and, at the same time, a co-firing composition having substantially the same composition as the ceramic raw powder is prepared. Next, the green ceramic molded body is fired in an atmosphere having an oxygen concentration of 90 vol % or more with the co-firing composition in contact with the green ceramic molded body.

The co-firing composition used in the above-mentioned manufacturing method is made of, for example, powder which is obtained by grinding a calcined raw material prepared to have the same composition as the ceramic molded body. By using the co-firing composition, volatilization of a volatile component contained in the ceramic molded body can be suppressed during the firing step. Therefore, in the firing step, firing is preferably performed under the condition in which the green ceramic molded body is buried in the powder of the co-firing composition. Note that the co-firing composition is not limited to a powder and may be a molded body or a sintered body.

Although the co-firing composition preferably has the same composition as that of the ceramic raw powder used for the ceramic molded body, the co-firing composition need only be substantially the same composition as that of the ceramic raw powder. The sentence "the co-firing composition has substantially the same composition as that of the ceramic raw powder used for the green ceramic molded body" means that the co-firing composition has a corresponding composition system composed of the same constituent elements as the ceramic raw powder but the co-firing composition may not have the exactly same composition ratio as the ceramic raw powder. Furthermore, the co-firing composition may not necessarily have a composition which can impart translucency.

Note that the pressure in the firing step may be equal to the atmospheric pressure or less. That is, pressurization, such as hot isostatic pressing (HIP), is unnecessary.

Furthermore, the translucent ceramic of the present invention can be used for optical components such as lenses. Examples of such lenses include a double-convex lens 10, a double-concave lens 11, a meniscus lens 12, an optical length adjustor 13, and a spherical lens 14 as shown in FIGS. 1 to 5.

Now, an optical apparatus on which such an optical component is mounted is described with reference to an optical pickup as an example.

Figure 6:
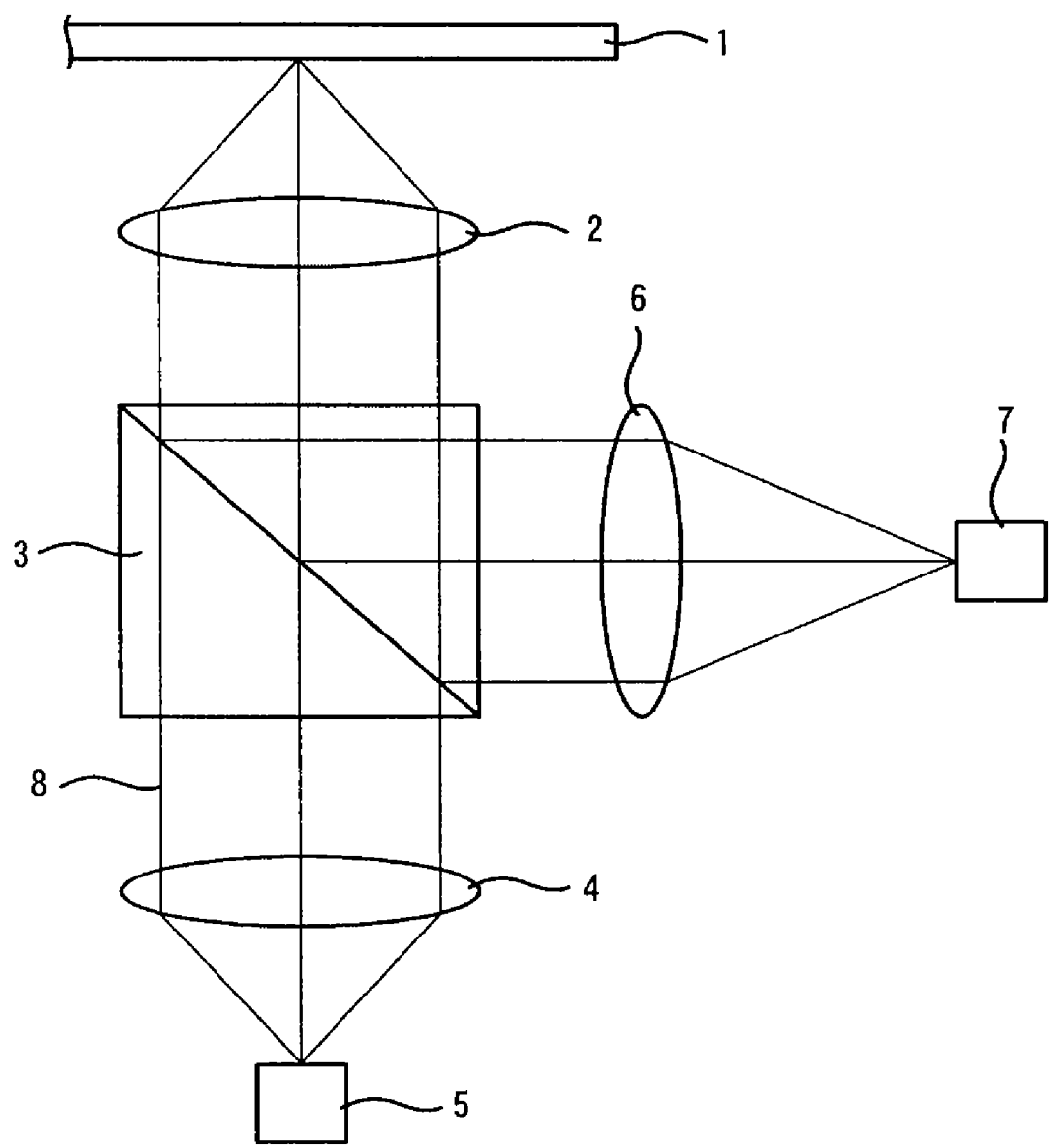
FIG. 6 is a schematic front view showing an optical pickup 9 as an example of an optical apparatus provided with an optical component made of a translucent ceramic of the present invention.

As shown in FIG. 6, an optical pickup 9 irradiates a laser beam 8, which is coherent, to a recording medium 1 such as a compact disc or a minidisc and reproduces information recorded on the recording medium 1 using reflected light.

Such an optical pickup 9 has a semiconductor laser 5 serving as a light source, a collimator lens 4 converting the laser beam 8 into a parallel light, and a half mirror 3 disposed on the optical path of the parallel light. The half mirror 3 transmits incident light coming from the collimator lens 4 to allow the light to continue traveling straight, and changes by about 90 degrees the traveling direction of reflected light coming from the recording medium 1 by reflection.

Furthermore, the optical pickup 9 has an object lens 2 provided for condensing the incident light coming from the half mirror 3 onto a surface of a recording face of the recording medium 1. The object lens 2 is also provided to effectively transmit the light reflected by the recording medium 1 toward the half mirror 3. When the reflected light is incident on the half mirror 3, the traveling direction of the reflected light is changed because the phase of the incident light is changed by reflection.

Furthermore, the optical pickup 9 has a condensing lens 6 to condense the reflected light, whose traveling direction has been changed. A light receiving element 7 is disposed at a condensing position of the reflected light in order to reproduce information obtained from the reflected light.

In the optical pickup 9 having such a structure, the translucent ceramic of the present invention can be advantageously used as a material for, for example, the object lens 2, the half mirror 3, the collimator lens 4, and the condensing lens 6 because of the high linear transmittance and the high F value thereof.

Furthermore, as another example of the optical apparatuses, an optical system for single-lens reflex cameras is described.

Figure 7:
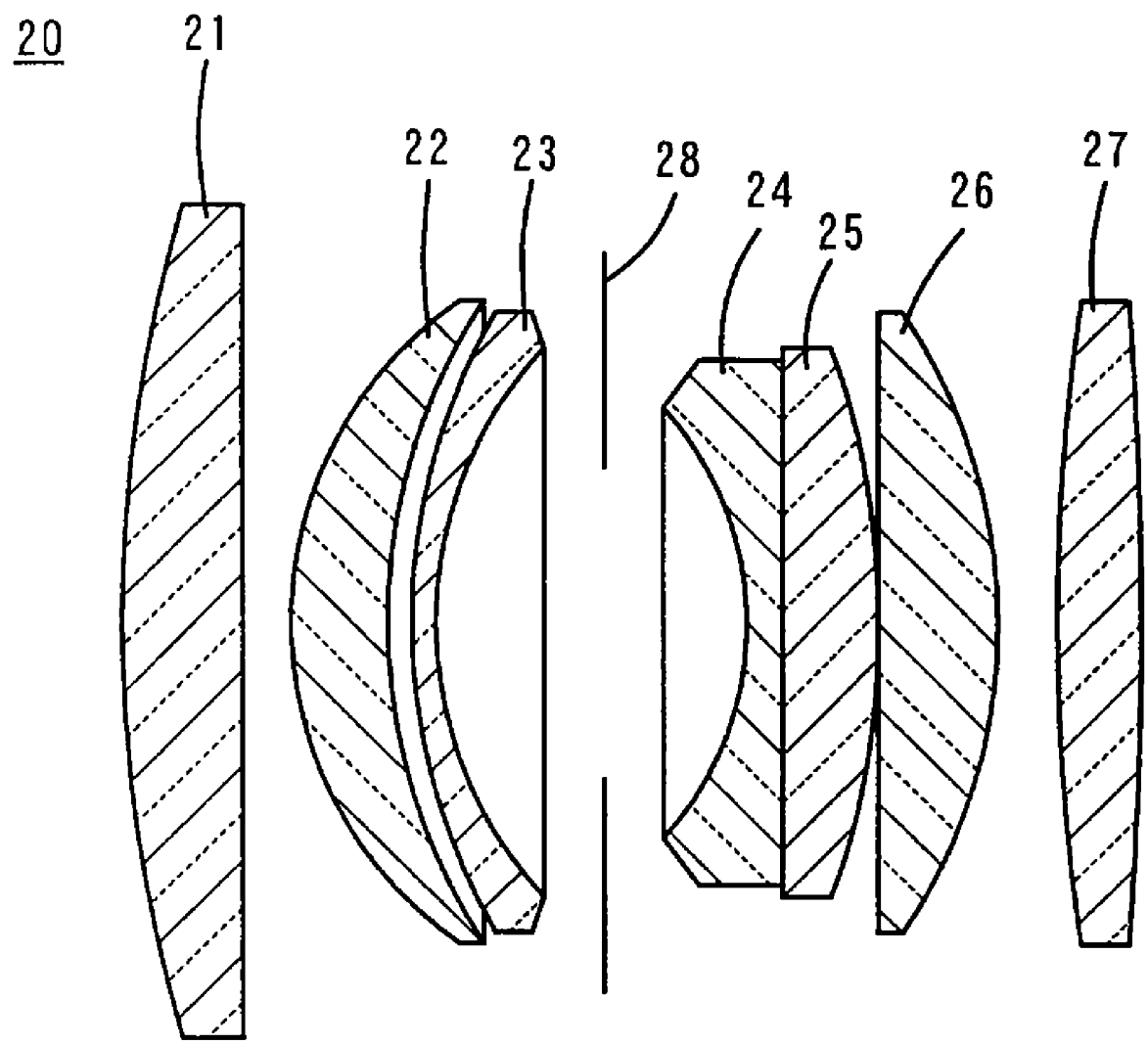
FIG. 7 is a schematic side view showing a Gauss lens optical system 20 as an example of an optical apparatus including an optical component made of a translucent ceramic of the present invention.

As shown in FIG. 7, a Gauss lens optical system 20, which is widely used as an optical system for single-lens reflex cameras, has seven lenses, namely lens 21 to lens 27. In particular, if the translucent ceramic of the present invention having a large Abbe number is used for lenses 22 and 25, which are disposed so as to hold a diaphragm 28 therebetween, correction of chromatic aberration can be accurately performed.

Next, the translucent ceramic of the present invention is described on the basis of experimental examples.

EXPERIMENTAL EXAMPLE 1

As raw materials, high-purity powders of $La(OH)_3$, $BaCO_3$, $SrCO_3$, $CaCO_3$, $Al_2O_3$, $Ta_2O_5$, and $Nb_2O5$ were prepared. In order to obtain the samples shown in Tables 1 and 2, which are represented by a general formula $(La_{1-x}(Sr_{1-a-b}Ba_a Ca_b)_x)((Al_{1-c}Ga_c)_{1-y}(Ta_{1-d}Nb_d)_y)_v O_w$ (wherein w is a positive number determined to maintain the electrical neutrality of the translucent ceramic), the raw powders were weighed and wet-blended for 20 hours in a ball mill. The resulting mixture was dried and then calcined at 1300° C. for 3 hours to form calcined powder. The value of w measured after calcination was about 3.

TABLE 1

| Sample No. | x | a | b | y | c | d | y/x | v |
|---|---|---|---|---|---|---|---|---|
| 1 | 0.05 | 0.0 | 0.0 | 0.025 | 0 | 0 | 0.505 | 1.000 |
| 2 | 0.10 | 0.0 | 0.0 | 0.051 | 0 | 0 | 0.505 | 1.000 |
| 3 | 0.15 | 0.0 | 0.0 | 0.076 | 0 | 0 | 0.505 | 1.000 |
| 4 | 0.20 | 0.0 | 0.0 | 0.101 | 0 | 0 | 0.505 | 1.000 |
| 5 | 0.25 | 0.0 | 0.0 | 0.126 | 0 | 0 | 0.505 | 1.000 |
| 6 | 0.30 | 0.0 | 0.0 | 0.152 | 0 | 0 | 0.505 | 1.000 |
| 7 | 0.35 | 0.0 | 0.0 | 0.177 | 0 | 0 | 0.505 | 1.000 |
| 8 | 0.40 | 0.0 | 0.0 | 0.202 | 0 | 0 | 0.505 | 1.000 |
| 9 | 0.40 | 0.1 | 0.0 | 0.202 | 0 | 0 | 0.505 | 1.000 |
| 10 | 0.40 | 0.0 | 0.1 | 0.202 | 0 | 0 | 0.505 | 1.000 |
| 11 | 0.40 | 0.0 | 0.0 | 0.202 | 0 | 0.1 | 0.505 | 1.000 |
| 12 | 0.50 | 0.0 | 0.0 | 0.253 | 0 | 0 | 0.505 | 1.000 |
| 13 | 0.60 | 0.0 | 0.0 | 0.303 | 0 | 0 | 0.505 | 1.000 |
| 14 | 0.70 | 0.0 | 0.0 | 0.354 | 0 | 0 | 0.505 | 1.000 |
| 15 | 0.80 | 0.0 | 0.0 | 0.404 | 0 | 0 | 0.505 | 1.000 |
| 16 | 0.85 | 0.0 | 0.0 | 0.429 | 0 | 0 | 0.505 | 1.000 |
| 17 | 0.90 | 0.0 | 0.0 | 0.455 | 0 | 0 | 0.505 | 1.000 |
| 18 | 1.00 | 0.0 | 0.0 | 0.505 | 0 | 0 | 0.505 | 1.000 |
| 19 | 1.00 | 0.0 | 0.0 | 0.550 | 0 | 0 | 0.55 | 1.000 |
| 20 | 1.00 | 0.0 | 0.0 | 0.580 | 0 | 0 | 0.58 | 1.000 |
| 21 | 1.00 | 0.0 | 0.0 | 0.600 | 0 | 0 | 0.6 | 1.000 |
| 22 | 1.00 | 0.0 | 0.0 | 0.620 | 0 | 0 | 0.62 | 1.000 |
| 23 | 0.39 | 0.0 | 0.0 | 0.200 | 0 | 0 | 0.508 | 0.894 |
| 24 | 0.39 | 0.0 | 0.0 | 0.200 | 0 | 0 | 0.508 | 0.903 |
| 25 | 0.41 | 0.0 | 0.0 | 0.200 | 0 | 0 | 0.489 | 0.947 |
| 26 | 0.41 | 0.0 | 0.0 | 0.200 | 0 | 0 | 0.483 | 0.958 |
| 27 | 0.41 | 0.0 | 0.0 | 0.200 | 0 | 0 | 0.491 | 0.969 |
| 28 | 0.40 | 0.0 | 0.0 | 0.200 | 0 | 0 | 0.506 | 0.969 |
| 29 | 0.39 | 0.0 | 0.0 | 0.200 | 0 | 0 | 0.512 | 0.977 |
| 30 | 0.41 | 0.0 | 0.0 | 0.200 | 0 | 0 | 0.486 | 0.980 |
| 31 | 0.40 | 0.0 | 0.0 | 0.200 | 0 | 0 | 0.5 | 0.980 |
| 32 | 0.39 | 0.0 | 0.0 | 0.200 | 0 | 0 | 0.507 | 0.980 |
| 33 | 0.41 | 0.0 | 0.0 | 0.200 | 0 | 0 | 0.488 | 0.984 |
| 34 | 0.40 | 0.0 | 0.0 | 0.200 | 0 | 0 | 0.504 | 0.986 |
| 35 | 0.39 | 0.0 | 0.0 | 0.200 | 0 | 0 | 0.512 | 0.986 |
| 36 | 0.41 | 0.0 | 0.0 | 0.199 | 0 | 0 | 0.488 | 0.988 |
| 37 | 0.41 | 0.0 | 0.0 | 0.200 | 0 | 0 | 0.491 | 0.988 |
| 38 | 0.41 | 0.0 | 0.0 | 0.201 | 0 | 0 | 0.493 | 0.988 |
| 39 | 0.40 | 0.0 | 0.0 | 0.200 | 0 | 0 | 0.506 | 0.988 |
| 40 | 0.40 | 0.0 | 0.0 | 0.160 | 0 | 0 | 0.395 | 0.992 |
| 41 | 0.40 | 0.0 | 0.0 | 0.164 | 0 | 0 | 0.405 | 0.992 |
| 42 | 0.40 | 0.0 | 0.0 | 0.168 | 0 | 0 | 0.415 | 0.992 |
| 43 | 0.40 | 0.0 | 0.0 | 0.180 | 0 | 0 | 0.445 | 0.992 |

TABLE 2

| Sample No. | x | a | b | y | c | d | y/x | v |
|---|---|---|---|---|---|---|---|---|
| 44 | 0.40 | 0.0 | 0.0 | 0.188 | 0 | 0 | 0.464 | 0.992 |
| 45 | 0.40 | 0.0 | 0.0 | 0.198 | 0 | 0 | 0.489 | 0.992 |
| 46 | 0.40 | 0.0 | 0.0 | 0.199 | 0 | 0 | 0.491 | 0.992 |
| 47 | 0.40 | 0.0 | 0.0 | 0.200 | 0 | 0 | 0.494 | 0.992 |
| 48 | 0.40 | 0.0 | 0.0 | 0.201 | 0 | 0 | 0.496 | 0.992 |
| 49 | 0.40 | 0.0 | 0.0 | 0.202 | 0 | 0 | 0.499 | 0.992 |
| 50 | 0.40 | 0.0 | 0.0 | 0.200 | 0 | 0 | 0.501 | 0.992 |
| 51 | 0.39 | 0.0 | 0.0 | 0.200 | 0 | 0 | 0.509 | 0.992 |
| 52 | 0.39 | 0.0 | 0.0 | 0.200 | 0 | 0 | 0.517 | 0.992 |
| 53 | 0.38 | 0.0 | 0.0 | 0.200 | 0 | 0 | 0.525 | 0.992 |
| 54 | 0.40 | 0.0 | 0.0 | 0.220 | 0 | 0 | 0.544 | 0.992 |
| 55 | 0.40 | 0.0 | 0.0 | 0.224 | 0 | 0 | 0.553 | 0.992 |
| 56 | 0.40 | 0.0 | 0.0 | 0.240 | 0 | 0 | 0.593 | 0.992 |
| 57 | 0.40 | 0.0 | 0.0 | 0.244 | 0 | 0 | 0.603 | 0.992 |
| 58 | 0.40 | 0.0 | 0.0 | 0.199 | 0 | 0 | 0.494 | 0.996 |
| 59 | 0.40 | 0.0 | 0.0 | 0.200 | 0 | 0 | 0.497 | 0.996 |
| 60 | 0.40 | 0.0 | 0.0 | 0.201 | 0 | 0 | 0.499 | 0.996 |
| 61 | 0.40 | 0.0 | 0.0 | 0.200 | 0 | 0 | 0.506 | 0.998 |
| 62 | 0.39 | 0.0 | 0.0 | 0.200 | 0 | 0 | 0.514 | 0.998 |

TABLE 2-continued

| Sample No. | x | a | b | y | c | d | y/x | v |
|---|---|---|---|---|---|---|---|---|
| 63 | 0.40 | 0.0 | 0.0 | 0.198 | 0 | 0 | 0.495 | 1.000 |
| 64 | 0.40 | 0.0 | 0.0 | 0.200 | 0 | 0 | 0.5 | 1.000 |
| 65 | 0.41 | 0.0 | 0.0 | 0.200 | 0 | 0 | 0.488 | 1.004 |
| 66 | 0.40 | 0.0 | 0.0 | 0.200 | 0 | 0 | 0.503 | 1.004 |
| 67 | 0.39 | 0.0 | 0.0 | 0.200 | 0 | 0 | 0.519 | 1.004 |
| 68 | 0.40 | 0.0 | 0.0 | 0.200 | 0 | 0 | 0.506 | 1.008 |
| 69 | 0.40 | 0.0 | 0.0 | 0.200 | 0 | 0 | 0.494 | 1.012 |
| 70 | 0.40 | 0.0 | 0.0 | 0.200 | 0 | 0 | 0.497 | 1.016 |
| 71 | 0.39 | 0.0 | 0.0 | 0.200 | 0 | 0 | 0.513 | 1.016 |
| 72 | 0.40 | 0.0 | 0.0 | 0.200 | 0 | 0 | 0.506 | 1.029 |
| 73 | 0.40 | 0.0 | 0.0 | 0.200 | 0 | 0 | 0.5 | 1.053 |
| 74 | 0.40 | 0.0 | 0.0 | 0.200 | 0 | 0 | 0.5 | 1.087 |
| 75 | 0.40 | 0.0 | 0.0 | 0.200 | 0 | 0 | 0.5 | 1.111 |
| 76 | 0.40 | 0.5 | 0.0 | 0.202 | 0 | 0 | 0.499 | 0.992 |
| 77 | 0.40 | 1.0 | 0.0 | 0.202 | 0 | 0 | 0.499 | 0.992 |
| 78 | 0.40 | 0.0 | 0.5 | 0.202 | 0 | 0 | 0.499 | 0.992 |
| 79 | 0.40 | 0.0 | 1.0 | 0.202 | 0 | 0 | 0.499 | 0.992 |
| 80 | 0.40 | 0.0 | 0.0 | 0.202 | 0 | 0.5 | 0.499 | 0.992 |
| 81 | 0.40 | 0.0 | 0.0 | 0.202 | 0 | 1 | 0.499 | 0.992 |
| 82 | 0.39 | 0.0 | 0.0 | 0.200 | 0.1 | 0 | 0.509 | 0.992 |
| 83 | 0.39 | 0.0 | 0.0 | 0.200 | 0.2 | 0 | 0.509 | 0.992 |
| 84 | 0.39 | 0.0 | 0.0 | 0.200 | 0.5 | 0 | 0.509 | 0.992 |
| 85 | 0.39 | 0.0 | 0.0 | 0.200 | 1 | 0 | 0.509 | 0.992 |

Next, the above-mentioned calcined powder was placed into a ball mill together with water and an organic binder. The resulting mixture was wet-ground for 16 hours. Ethyl cellulose was used as the organic binder.

The ground material was dried and then granulated by screening through a 50-mesh net (screen). By press-forming the obtained powder at a pressure of 196 MPa, a green ceramic molded body formed into a disc having a diameter of 30 mm and a thickness of 2 mm was obtained.

Next, the green ceramic molded body was buried in a powder having the same composition as the ceramic raw powder constituting the green ceramic molded body. The buried green ceramic molded body was set in a furnace and heated in air so as to release the binder. Oxygen gas was then introduced into the furnace while the temperature of the furnace was increased. When the temperature reached the maximum region, 1600 to 1700° C., the oxygen concentration in the firing atmosphere was increased to about 98 vol %. The optimum temperature as the maximum temperature was properly determined in accordance with the composition of the material. For example, for sample 8, the maximum temperature was 1675° C. The firing temperature and the oxygen concentration were maintained and the green ceramic molded body was fired for 20 hours to produce a sintered body. The total pressure during firing was 1 atm.

The sintered body obtained through such this process was mirror-processed and finished to a disc having a thickness of 0.4 mm to prepare a sample of the translucent ceramic.

Each sample mentioned above was measured with respect to linear transmittance and refractive index in the visible light range, and more specifically, at a wavelength λ of 633 nm. A spectrophotometer (Shimadzu Corporation, UV-2500) was used in the measurement of linear transmittances and a prism coupler (Metricon, MODEL2010) was used in the measurement of refractive indices.

Furthermore, refractive indices were measured using the prism coupler at wavelengths of 405 nm, 532 nm, and 830 nm. Then, constants A, B, and C in Formula 1 which is a relational expression between wavelength and refractive index were calculated by using the values of refractive indices measured at the three wavelengths to determine a relation between wavelength and refractive index.

$$n = A/\lambda^4 + B/\lambda^2 + C \qquad \text{Formula 1}$$

(n is a refractive index; λ is a wavelength; and A, B, and C are constants)

By using the formula, refractive indices at the three wavelengths (F line, 486.13 nm; d line, 587.56 nm; and C line, 656.27 nm) required for calculation of Abbe numbers (vd), were determined and then the Abbe numbers were calculated in accordance with the definition formula of the Abbe number, Formula 2.

$$\nu_d = (n_d - 1)/(n_F - n_C) \qquad \text{Formula 2}$$

($n_d$, $n_F$, and $n_C$ are refractive indices measured with the d line, F line, and C line, respectively)

The measurement results of the linear transmittance, refractive indices, and Abbe numbers, which were obtained through the above-mentioned method, are shown in Table 3 and Table 4.

TABLE 3

| Sample No. | Linear Transmittance (%) | Refractive Index $n_d$ | Abbe Number $\nu_d$ |
|---|---|---|---|
| 1 | 25.0 | 2.059 | 43.6 |
| 2 | 38.0 | 2.057 | 42.9 |
| 3 | 42.3 | 2.054 | 42.2 |
| 4 | 53.8 | 2.051 | 41.4 |
| 5 | 59.1 | 2.049 | 40.8 |
| 6 | 65.8 | 2.047 | 40.0 |
| 7 | 67.7 | 2.045 | 39.4 |
| 8 | 70.9 | 2.043 | 38.8 |
| 9 | 53.2 | 2.044 | 38.8 |
| 10 | 59.5 | 2.042 | 38.8 |
| 11 | 71.3 | 2.045 | 38.2 |
| 12 | 73.2 | 2.039 | 37.8 |
| 13 | 73.5 | 2.033 | 36.2 |
| 14 | 72.8 | 2.029 | 34.8 |
| 15 | 73.0 | 2.024 | 33.5 |
| 16 | 71.5 | 2.022 | 32.8 |
| 17 | 70.1 | 2.020 | 32.1 |
| 18 | 68.5 | 2.015 | 30.8 |
| 19 | 59.5 | 2.017 | 30.8 |
| 20 | 43.2 | 2.018 | 30.8 |
| 21 | 27.2 | 2.019 | 30.8 |
| 22 | 7.2 | 2.019 | 30.8 |
| 23 | 3.5 | 2.041 | 38.8 |
| 24 | 21.5 | 2.041 | 38.8 |
| 25 | 36.4 | 2.041 | 38.7 |
| 26 | 51.7 | 2.041 | 38.7 |
| 27 | 55.8 | 2.041 | 38.4 |
| 28 | 54.4 | 2.044 | 38.3 |
| 29 | 51.8 | 2.043 | 38.2 |
| 30 | 59.4 | 2.042 | 38.0 |
| 31 | 65.2 | 2.043 | 38.6 |
| 32 | 54.8 | 2.043 | 38.7 |
| 33 | 63.3 | 2.042 | 38.9 |
| 34 | 62.3 | 2.042 | 38.8 |
| 35 | 61.5 | 2.043 | 38.9 |
| 36 | 68.5 | 2.042 | 39.2 |
| 37 | 69.6 | 2.042 | 38.9 |
| 38 | 71.8 | 2.042 | 39.0 |
| 39 | 70.9 | 2.043 | 38.8 |
| 40 | 3.8 | 2.041 | 39.0 |
| 41 | 21.3 | 2.041 | 39.1 |
| 42 | 30.2 | 2.041 | 39.1 |
| 43 | 45.5 | 2.041 | 39.1 |

TABLE 4

| Sample No. | Linear Transmittance (%) | Refractive Index $n_d$ | Abbe Number $v_d$ |
|---|---|---|---|
| 44 | 53.0 | 2.043 | 39.1 |
| 45 | 69.4 | 2.042 | 39.1 |
| 46 | 70.7 | 2.042 | 39.1 |
| 47 | 72.7 | 2.043 | 38.6 |
| 48 | 73.3 | 2.042 | 39.0 |
| 49 | 73.2 | 2.043 | 39.1 |
| 50 | 72.8 | 2.043 | 39.0 |
| 51 | 73.6 | 2.043 | 38.8 |
| 52 | 62.5 | 2.043 | 38.9 |
| 53 | 56.0 | 2.044 | 39.0 |
| 54 | 50.8 | 2.043 | 38.8 |
| 55 | 42.1 | 2.043 | 38.8 |
| 56 | 31.5 | 2.044 | 38.8 |
| 57 | 17.2 | 2.044 | 38.7 |
| 58 | 61.9 | 2.042 | 39.1 |
| 59 | 67.2 | 2.042 | 38.9 |
| 60 | 66.8 | 2.042 | 39.0 |
| 61 | 67.5 | 2.042 | 39.0 |
| 62 | 73.4 | 2.043 | 39.0 |
| 63 | 67.9 | 2.042 | 39.0 |
| 64 | 70.7 | 2.042 | 39.0 |
| 65 | 51.4 | 2.043 | 38.2 |
| 66 | 60.8 | 2.043 | 38.7 |
| 67 | 67.9 | 2.043 | 38.6 |
| 68 | 60.9 | 2.042 | 38.7 |
| 69 | 55.3 | 2.041 | 38.8 |
| 70 | 53.3 | 2.041 | 38.8 |
| 71 | 50.4 | 2.043 | 38.5 |
| 72 | 30.3 | 2.042 | 38.6 |
| 73 | 23.1 | 2.042 | 38.6 |
| 74 | 20.1 | 2.042 | 38.6 |
| 75 | 3.8 | 2.042 | 38.6 |
| 76 | 32.5 | 2.045 | 38.8 |
| 77 | 20.2 | 2.046 | 38.8 |
| 78 | 48.2 | 2.043 | 38.7 |
| 79 | 23.1 | 2.044 | 38.7 |
| 80 | 65.3 | 2.048 | 36.5 |
| 81 | 58.2 | 2.051 | 34.2 |
| 82 | 71.8 | 2.044 | 38.8 |
| 83 | 69.5 | 2.045 | 38.7 |
| 84 | 52.5 | 2.049 | 38.6 |
| 85 | 27.2 | 2.050 | 38.5 |

According to samples of the present invention shown in Table 1 and Table 2, that is, Samples 1 to 21, 24 to 39, 41 to 56, 58 to 74, and 76 to 85, each of which satisfies the conditions; $0<x\leq1$, $0<y\leq0.6$, $0.4\leq y/x\leq0.6$, $0\leq a\leq1$, $0\leq b\leq1$, $0\leq c\leq1$, $0\leq d\leq1$, and $0.9\leq v\leq1.1$, the refractive indices $n_d$ are 2.01 or more, the Abbe numbers $v_d$ are 30 or more, and the linear transmittances are 20% or more as shown in Table 3 and Table 4.

In particular, since each of Samples 4 to 19, 26 to 39, 44 to 54, 58 to 71, and 80 to 84 further satisfies the conditions $0.2\leq x\leq1$, $0.45\leq y/x\leq0.55$, $0.95\leq v\leq1.02$, $0\leq a\leq0.1$, $0\leq b\leq0.1$, and $0\leq c\leq0.5$, the linear transmittance is as high as 50% or more.

In contrast, since the values of y/x of Samples 22, 23, 40, 57, and 75 are out of the range of 0.4 to 0.6, or the values of v thereof are out of the range of 0.9 to 1.1, the linear transmittances thereof is less than 20%.

EXPERIMENTAL EXAMPLE 2

Next, Sample 8 shown in Table 1 was measured with respect to refractive index $n_d$ in the TE-mode and TM-mode at a wavelength λ of 587.562 nm (d line). As a result, it was found that birefringence did not occur because both of the refractive indices were 2.043.

As mentioned above, the present invention has been specifically described with reference to the experimental examples. However, embodiments of the present invention are not limited to the above-mentioned experimental examples. For example, the raw materials are not limited to oxides, carbonates, or hydrides, and any raw material may be used as long as a sintered body made of the raw material has desired properties. With respect to the firing atmosphere, the oxygen concentration of about 98 vol % in the above-mentioned experimental examples was the optimum value under the conditions for equipment used in the experiments. But, the oxygen concentration is not limited to about 98 vol %, and it was found that if the oxygen concentration is 90 vol % or more, a sintered body having desired properties can be obtained.

The invention claimed is:

1. A translucent ceramic comprising a polycrystalline perovskite compound as a main component having a composition represented by the general formula

$$La_{1-x}(Sr_{1-a-b}Ba_aCa_b)_x)((Al_{1-c}Ga_c)_{1-y}(Ta_{1-d}Nb_d)_y)_vO_w$$

in which $0<x\leq1$, $0<y\leq0.6$, $0.4\leq y/x\leq0.6$, $0\leq a\leq1$, $0\leq b\leq1$, $0\leq c\leq1$, $0\leq d\leq1$, $0.9\leq v\leq1.1$, and w is a positive number which maintains the electrical neutrality of the translucent ceramic.

2. The translucent ceramic according to claim 1, wherein $0.45\leq y/x\leq0.55$, $0.95\leq v\leq1.02$, and $0.2\leq x\leq1$.

3. The translucent ceramic according to claim 2, wherein a linear transmittance of the translucent ceramic when a sample having a thickness of 0.4 mm is measured using visible light having a wavelength of 633 nm is 50% or more.

4. The translucent ceramic according to claim 3, wherein a, b, c, and d are 0, $x\leq0.9$, and $<y\leq0.58$.

5. The translucent ceramic according to claim 1, wherein a linear transmittance of the translucent ceramic when a sample having a thickness of 0.4 mm is measured using visible light having a wavelength of 633 nm is 20% or more.

6. A method for manufacturing the translucent ceramic of claim 1, the method comprising the steps of:
providing a green ceramic molded body made of ceramic raw powder and formed in a predetermined shape;
providing a co-firing composition having substantially the same composition as the ceramic raw powder; and
firing the green ceramic molded body in an atmosphere at an oxygen concentration of 90 vol % or more with the co-firing composition in contact with the green ceramic molded body.

7. The method for manufacturing the translucent ceramic according to claim 6, wherein the co-firing composition is in a powder state and the firing step is performed with the green ceramic molded body buried in the powder of the co-firing composition.

8. An optical component comprising the translucent ceramic according to claim 1.

9. An optical apparatus provided with the optical component according to claim 8.

10. An optical component comprising the translucent ceramic according to claim 2.

11. An optical apparatus provided with the optical component according to claim 10.

12. An optical component comprising the translucent ceramic according to claim 4.

13. An optical apparatus provided with the optical component according to claim 12.

14. An optical component comprising the translucent ceramic according to claim 5.

15. An optical apparatus provided with the optical component according to claim 14.

* * * * *